United States Patent [19]

Chan et al.

[11] Patent Number: 4,969,402

[45] Date of Patent: Nov. 13, 1990

[54] ARTICLE HAVING PERMANENT INDICIA THEREON

[75] Inventors: Randolph W. Chan, Palo Alto; Lawrence D. Schwartz, Menlo Park; Richard E. Rodkey, Pleasanton, all of Calif.

[73] Assignee: Raychem Corporation, Menlo Park, Calif.

[21] Appl. No.: 304,541

[22] Filed: Jan. 31, 1989

[51] Int. Cl.[5] .......................... B41L 35/14; B32B 3/00
[52] U.S. Cl. ................................. 101/488; 101/491; 400/241; 428/35.1; 428/207
[58] Field of Search ............... 428/35.1, 36.92, 195, 428/207; 101/487, 491, 488; 400/241.1, 241

[56] References Cited

U.S. PATENT DOCUMENTS

| | | | |
|---|---|---|---|
| 2,486,259 | 10/1949 | Chavannes | 101/211 |
| 2,722,038 | 11/1955 | Freund | 18/48 |
| 4,206,909 | 6/1980 | Wintle | 101/35 |
| 4,461,793 | 6/1984 | Blok et al. | 428/219 |
| 4,541,340 | 9/1985 | Peart et al. | 101/470 |

FOREIGN PATENT DOCUMENTS 890430 of 1962 United Kingdom .
310384A2 of 1989 European Pat. Off. .

*Primary Examiner*—James Seidleck
*Attorney, Agent, or Firm*—Edith A. Rice; Herbert G. Burkard

[57] ABSTRACT

Permanent white indicia are applied to a polymeric surface, preferably of a black, heat-recoverable marker sleeve for wire or cable, using an ink composition comprising a pigment that is thermally stable at a temperature of at least about 350° C., preferably titanium dioxide and a binder, such as nitrocellulose, and then heating the surface to permatize the mark. The marked article passes MIL-STD-202 in mark permanence.

3 Claims, 1 Drawing Sheet

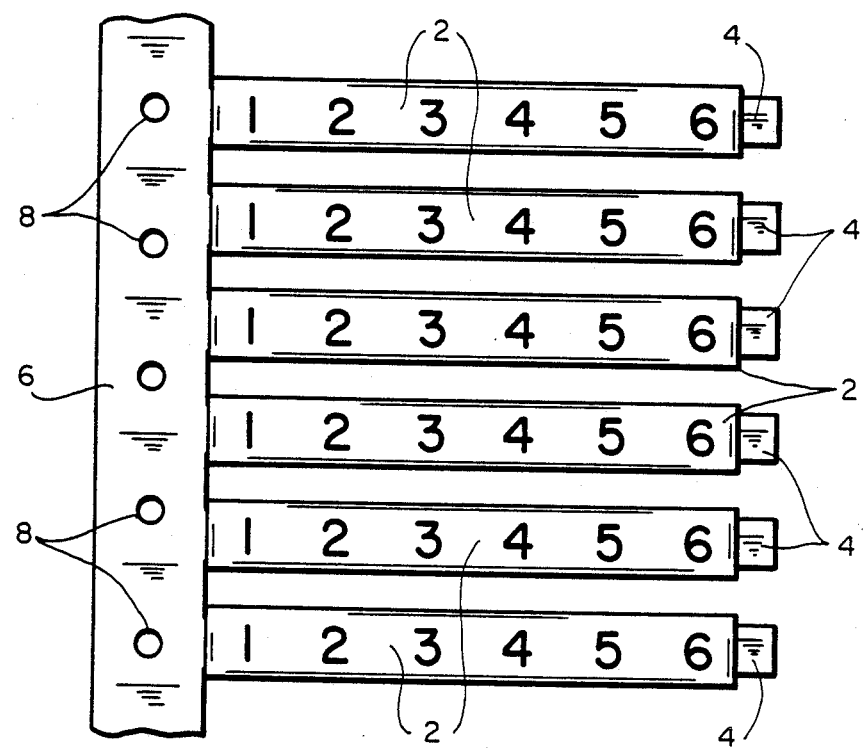
FIG_1

ARTICLE HAVING PERMANENT INDICIA THEREON

BACKGROUND OF THE INVENTION

This invention relates to an article with a polymeric surface having permanent indicia thereon and to a method of producing permanent indicia on a polymeric surface.

Substrates such as wires, cables, equipment housing and the like are sometimes labeled with marker assemblies comprising a polymeric article marked with indicia, such as letters or numbers or combinations thereof. To identify individual wires of a harness the marker assembly may comprise a sleeve, preferably heat recoverable, of a polymeric material such as a polyolefin, a vinylidene fluoride polymer or the like. Heat-recoverable marker sleeves are described in U.S. Pat. Nos. 3,894,731 to Evans and 4,349,404 to Changani et al. and U.S. patent application Ser. No. 07/221,708, filed Jul. 20, 1988, the disclosures of which are incorporated herein by reference. Such sleeves are provided in a variety of colors, including black, for color coding the wires. Relatively flat polymeric articles may be used for similarly marking large diameter cables and electrical equipment. The indicia are generally typed onto the article using typewriting or similar printing equipment. Generally, the ink used is black.

For many uses, the indicia need to be permanent e.g. resistant to being rubbed off and resistant to solvents which may contact the wire, as discussed more fully below. This latter requirement is generally specified for aircraft wiring, which may come into contact with hydraulic fluid, liquid fuel, de-icing solvents or the like. Indicia comprising black ink on polymeric surfaces are generally rendered permanent by a heat treatment. This heat treatment, referred to as permatization, may take place by subjecting the sleeve to infrared (IR) radiation. For some heat-recoverable sleeves, the heat applied during the heat-recovery step may be adequate to permatize the indicia. It is believed that during permatization, the black ink is preferentially heated and the carbon black of the ink undergoes a physical and/or chemical interaction with the polymeric surface rendering the indicia permanent. Obtaining a visible permanent mark on articles with other than black ink has necessitated use of a relatively expensive "hot-stamping" technique. For example, attempts to print black marker sleeves with permanent white indicia by applying white ink and then permatizing in conventional permatizers have typically been unsuccessful. The black sleeve tends to heat preferentially rather than the ink and this can lead to damage of the sleeve, particularly in its central region. It also has been noted that indicia toward the outer edges of the sleeve may be inadequately permatized. If the energy output of the IR source is increased to prevent this, the sleeve may be damaged or split.

We have now discovered that permanent, contrasting indicia can be obtained on a polymeric surface by use of an appropriate ink and an appropriate permatizing treatment, as discussed hereinafter.

SUMMARY OF THE INVENTION

One aspect of this invention comprises an article having a polymeric surface on which are permanent indicia, said indicia having been formed by applying to the surface, in a pattern to form the desired indicia, an ink composition comprising a pigment that is thermally stable at a temperature of at least 350° C. and a binder that decomposes at a temperature between about 150° and 350° C. and then rendering the indicia permanent by heating said surface.

Another aspect of this invention comprises a method of forming a permanent mark on a polymeric surface which comprises:

(a) selecting an article having a polymeric surface;

(b) forming indicia on the surface thereof with an ink comprising a pigment that is thermally stable at a temperature of at least about 350° C. and a binder that decomposes at a temperature between about 150° and 350° C.; and (c) heating the surface to render the indicia permanent.

BRIEF DESCRIPTION OF THE DRAWING

FIG. 1 is a perspective view of partially recovered heat recoverable tubular articles of this invention having permanent indicia thereon and mounted on a bandolier.

DETAILED DESCRIPTION OF THE INVENTION

The article marked in according with this invention has a polymeric surface. Preferably the entire article is made from a polymeric composition, but a composite article in which a surface layer only comprises a polymer may be employed.

The polymeric surface may be of virtually any polymer, for example, polyolefin, such as polyethylene, fluoropolymer, such as polyvinylidene fluoride and vinylidene fluoride copolymers, tetrafluoroethylene polymers, such as ethylene-tetrafluoroethylene copolymers, and the like.

The polymer composition may contain various additives, for example, flame retardants such as decabromodiphenyl ether, perchloropentacyclodecane, silicone resins, 1,2-bis (tetrabromophthalimido) ethylene, etc.; antioxidants such as alkylated phenols, e.g. those commercially available as Goodrite 3125, Irganox 1010, Irganox 1035, Irganox 1076, Irganox 1093, Vulkanox BKF, organic phosphite or phosphates, e.g. dilauryl phosphite, Mark 1178, alkylidene polyphenols, e.g. Ethanox 330, thio-bis alkylated phenol, e.g. Santonox R, dilauryl thio-dipropionate, e.g. Carstob DLTDP, dimyristyl thiodipropionate, e.g. Carstab DMTDP, distearyl thipdipropionate, e.g. Cyanox STDP, amines, e.g. Wingstay 29, etc.; inorganic fillers, such as clay, silica, etc.; pigments such as carbon black, titanium dioxide, zinc oxide, iron oxide, etc., processing aids, and the like.

Certain additives may improve durability or premanence of the mark while others may be detrimental, depending on the particular ink composition and the polymer of the surface. As mentioned above, the invention is particularly suitable for printing on black (or other dark-color) surfaces. This invention may, however, be utilized to print on surfaces of any color, providing there is sufficient visible contrast between the surface and the indicia.

The ink composition utilized in the instant invention comprises a pigment that is thermally stable at a temperature of at least about 350° C. and a binder. The pigment is preferably present in an amount of about 70 to about 98% by weight of the composition, more preferably in an amount of about 75 to about 95%, and most preferably about 85 to about 95%, all percentages being by weight, based on the weight of the ink composition. Typical pigments that can be used include, for example, titanium dioxide, red iron oxide, perylene red, disazo red, (CI pigment red 42), molybdate orange, cadmium sulfide, diarylide yellow, or the like. Titanium dioxide is particularly preferred. Mixtures of one or more pigments may be used to provide the desired color. The pigment is selected to provide a contrasting color to the color of the sleeve.

The binder comprises a macromolecular material which decomposes or undergoes some other chemical reaction at the permatizing temperature (discussed below) to form a coherent or adherent structure which retains said pigment on the surface and renders said indicia permanent. A preferred binder comprises nitrocellulose, which may contain a plasticizer.

The binder is preferably present in the ink composition in an amount of about 2 to about 30% by weight of the composition, more preferably 5 to 25% and most preferably 5 to 15%, all percentages being by weight based on the weight of the ink composition.

The ink composition may contain minor amounts of other ingredients.

For use in impact printers such as typewriters or computer daisy wheel printers, the ink is applied to a ribbon comprising a polymeric film. The ink is preferably applied by admixing the ink with a solvent which dissolves the binder and casting the resulting admixture onto the film. The solvent is then evaporated depositing the pigment and binder on the film. When dried the ink should be about 0.1 to about 1.4 mils thick, preferably about 0.2 to about 1.0 mils, and most preferably about 0.4 to 0.6 mils.

The polymeric film is preferably of polyester such as polyethylene terephthalate. The film should be about 0.1 to about 1 mil thick, preferably about 0.1 to about 0.9 mils and most preferably about 0.2 to about 0.5 mils.

Typically the ribbon coated with the ink is packaged in cartridges appropriate for use with the desired impact printer.

The article to be marked is fed through the printer and the appropriate indicia are applied. In the case of marker sleeves for wire and cable, the indicia extend from one end of the marker sleeve to the other. The marked article is then passed through a permatizer. As mentioned above, the indicia, or marks, may be inadequately permatized in conventional permatizers, it has been found that inks, other than black inks containing carbon black as a pigment, at the ends of the sleeves, or if the power of the IR source is increased, the sleeve may be damaged. In the case of heat-recoverable sleeves, the application of too much heat while the sleeve is restrained from recovery, as it usually is, can result in splitting of the sleeve.

FIG. 1 illustrates a typical arrangement for printing and permatizing heat-recoverable marker sleeves. In FIG. 1, marker sleeves, 2, are mounted on flat tines, 24, extending from an elongate spine, 6, provided with sprocket holes 8 for feeding the sleeves through a printer. FIG. 1 shows the assembly after it has been fed through the printer and indicia have been printed on the sleeves.

To permatize the indicia, the marked sleeves are heated, preferably, to a temperature of about 150° to about 350° C., more preferably to a temperature of about 250° to about 300° C. Preferably, the sleeve is heated to a temperature of at least about 250° C. for no more than about 30 seconds. If the indicia extend across the sleeve as shown in FIG. 1, the entire sleeve surface should be heated uniformly. However, should the indicia be positioned only on a relatively small region of the surface of the sleeve, e.g. the central region, only that region of the sleeve need be heated. As a practical matter, indicia are usually printed the full length of the sleeve.

It has been found that a conventional permatizer can be modified to uniformly heat the sleeves. In such a permatizer, the IR source comprises a lamp such as a quartz halogen lamp. A heat deflecting means, such as a metallic screen, can be positioned over the lamp to prevent overheating of any particular region of the sleeves. Since it is generally the central region of the sleeve which overheats, the heat deflection means is placed over the central region of the lamp.

After permatization, the mark is durable or permanent, i.e. resistant to abrasion and organic solvents. The degree of permanence varies depending on the particular application. For use in wire and harnessing for military use, resistance to organic solvents and abrasion is of paramount importance. In this regard, it is necessary for the marked article to meet the requirements of Military Specification MIL-M-81531 and Military Standard MIL-STD-202, both of which are incorporated by reference herein. With respect to abrasion, Military Specification MIL-M-81531 requires that the markings or indicia be readable after being rubbed with an eraser 20 times.

With respect to resistance to organic solvents, Military Standard MIL-STD-202 requires that the marks or indicia be readable after being immersed in a variety of organic solvents and then brushed with a toothbrush. These organic solvents include: mixtures of isopropyl alcohol and mineral spirits; an azeotrope mixture of trichlorotrifluoroethane (FREON ® TF, a registered trademark of E. I. DuPont de Nemours) and methylene chloride; 1,1,1-trichloroethane; and an aqueous solution of butyl cellusolve and monoethanolamine.

In addition to meeting the requirements of Military Standard MIL-STD-202, it is preferred that the markings or indicia be resistant to removal during prolonged immersion in the following organic solvents: JP-4 fuel (kerosene), Skydrol 500 TM (a phosphate ester hydraulic fluid available from Monsanto Company) hydraulic fluid (petroleum based), aviation gasoline, lubricating oil (ester based) and anti-icing fluid (an aqueous mixture of glycols). These organic solvents are further specified in the Raychem Corporation Specification RT-1800/2, which is incorporated by reference herein.

It is also preferred that the marked article according to the invention is resistant to dichloromethane which is representative of the class of halogenated solvents which include 1,1,1-trichloroethane and FREON mixtures.

It is, of course, anticipated that the marked article according to the invention will be resistant to many other organic solvents as well as many inorganic solvents.

It should be understood, then, that whenever throughout this specification the markings or indicia are stated to be permanent or durable they are resistant to organic solvents, smearing and abrasion, such resistance to organic solvents, smearing and abrasion shall be defined as indicated above.

EXAMPLE

An ink composition was formed by mixing 90 parts by weight titanium dioxide and 10 parts by weight nitrocellulose in a solvent. The solvent was cast onto a polyester film ribbon (Mylar, commercially available from du Pont). The film had a thickness of about 0.3 mil and the ink coating was 0.5 mils thick.

Using an impact printer, indicia of the ink composition were applied to black heat recoverable marker sleeves of each of polyethylene, polyvinylidene fluoride and ethylenetetrafluoroethylene copolymer in an arrangement similar to that of FIG. 1. The sleeves were then passed through a permatizer having a quartz halogen lamp (Quartzline lamp FCM (Q100073/4CL) 1000 Watts, 120 Volts, commercially available from General Electric Co.) as the source of IR heat. A ⅜" wide strip of stainless steel screen, mesh size 20 mesh, 0.016 wire, was placed over the central region of the lamp to provide uniform heating of the sleeves. The sleeves were tested for permanence using MIL-STD-202 and Raychem Specifications RT-1800/01 or RK-1800/02. All samples passed the tests.

What is claimed is:

1. A method of forming a permanent mark on a polymeric surface which comprises:

selecting an article having a polymeric surface;

forming indicia on the surface thereof by means of an impact printer and a film ribbon having deposited thereon an ink composition comprising titanium dioxide and nitrocellulose; and heating the surface to render the indicia permanent.

2. A method in accordance with claim 1, wherein the article selected is a heat recoverable article.

3. A method in accordance with claim 2, wherein the heat-recoverable article is tubular and is restrained from recovery during the heating step.

* * * * *